United States Patent [19]

Muyres et al.

[11] Patent Number: 5,577,792
[45] Date of Patent: Nov. 26, 1996

[54] MULTIPLE VISOR SYSTEM WITH ALIGNED PIVOT AXES

[75] Inventors: David A. Muyres, Hamilton, Mich.; Brian J. Smith, Cincinnati, Ohio

[73] Assignee: Prince Corporation, Holland, Mich.

[21] Appl. No.: 391,044

[22] Filed: Feb. 21, 1995

[51] Int. Cl.[6] ............................................. B60J 3/02
[52] U.S. Cl. ................................. 296/97.9; 296/97.12
[58] Field of Search ................... 296/97.1, 97.5, 296/97.6, 97.9, 97.12, 97.13

[56] References Cited

U.S. PATENT DOCUMENTS

| | | | |
|---|---|---|---|
| 2,634,161 | 4/1953 | Beets . | |
| 2,831,726 | 4/1958 | Ralston | 296/97.6 |
| 2,912,275 | 11/1959 | O'Neal . | |
| 3,191,986 | 6/1965 | Simon . | |
| 3,201,170 | 8/1965 | Weingarten | 296/97.6 |
| 3,825,296 | 7/1974 | Peterson | 296/97.13 |
| 4,858,982 | 8/1989 | Dykstra et al. . | |
| 4,941,704 | 7/1990 | Baumert et al. . | |
| 5,011,212 | 4/1991 | Viertel et al. | 296/97.9 |
| 5,213,389 | 5/1993 | Lofits et al. . | |
| 5,280,988 | 1/1994 | Gute | 296/97.12 |
| 5,331,525 | 7/1994 | Lawassani et al. | 296/97.9 |
| 5,421,632 | 6/1995 | Adomeit et al. | 296/97.9 |

FOREIGN PATENT DOCUMENTS

| | | | |
|---|---|---|---|
| 1305142 | 8/1962 | France | 296/97.9 |
| 1396366 | 3/1965 | France . | |

*Primary Examiner*—Dean Kramer
*Attorney, Agent, or Firm*—Price, Heneveld, Cooper, DeWitt & Litton

[57] ABSTRACT

A first visor is mounted to a vehicle by a first pivot rod for movement between a raised stored position and a lowered use position, and a second visor is mounted to the vehicle by a second pivot rod for pivoting the second visor between a raised stored position and lowered use position including a position generally orthogonal to the first visor for providing front and side window protection. The pivot rods are aligned in end-to-end relationship which allows the nested mounting of the visors when the visors are in a stored position adjacent each other.

26 Claims, 3 Drawing Sheets

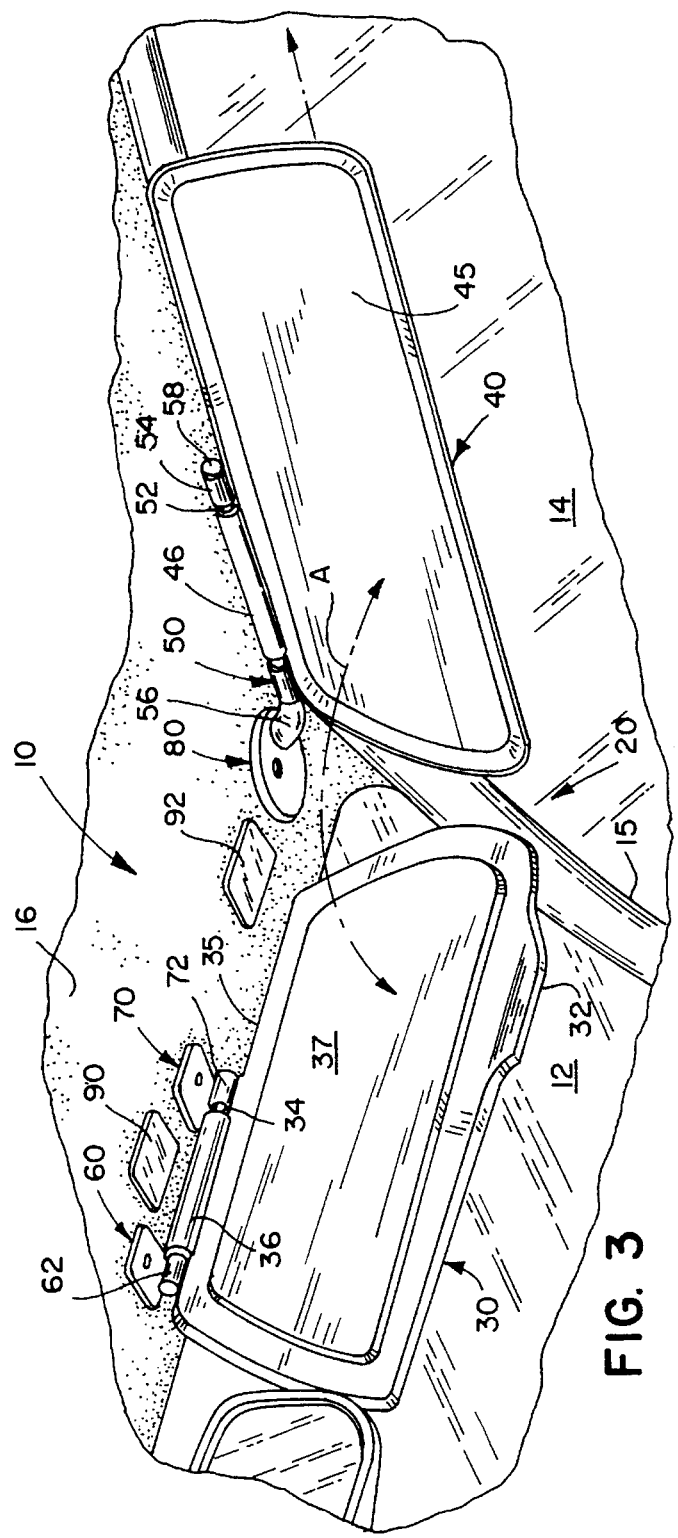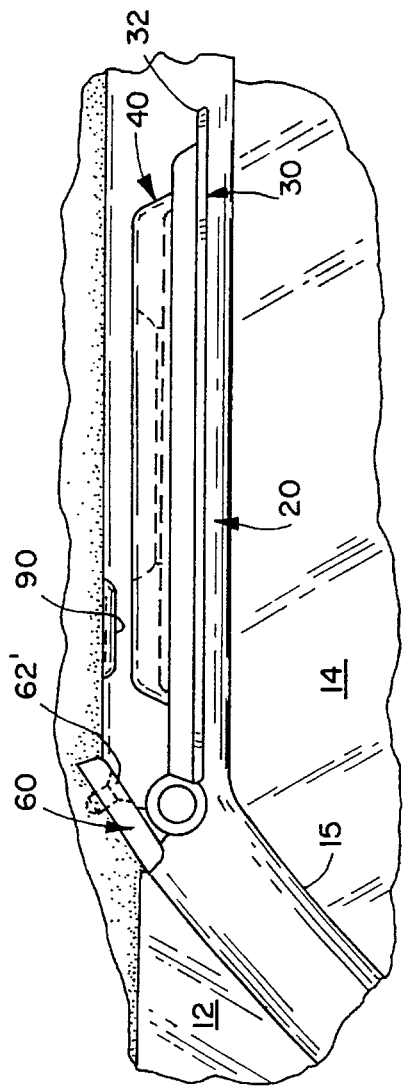

5,577,792

MULTIPLE VISOR SYSTEM WITH ALIGNED PIVOT AXES

BACKGROUND OF THE INVENTION

The present invention relates to vehicle visors and particularly to multiple visors providing selective window coverage for the windshield, the side window, or both.

There exists a variety of multiple visor systems in which two or more visor panels are employed to provide windshield coverage, side window coverage, or both, for the convenience of the vehicle operator or passenger. U.S. Pat. No. 4,858,982 represents a nested visor system in which multiple visor panels are employed and share mounting brackets for their controlled movement between stored and selected use positions. This visor system includes a plurality of panels which nest to form, in appearance, a single visor when in a stored position or in a use position along the windshield. In order to provide simultaneous pivoting of the multiple panels, pivot rods for the visor panels overlap and have axes which are offset. This adds somewhat to the complexity and, therefore, the cost of both the mounting brackets and the pivot rods for the visor installation.

An improved multiple visor system is represented by U.S. patent application Ser. No. 08/136,416 filed on Oct. 13, 1993 now U.S. Pat. No. 5,421,632 and entitled Multiple Visor System With Concentric Pivot Axes. In this system, multiple panels are employed which include coaxially aligned pivot couplings which include a variety of different configurations, including semi-cylindrical members which receive nesting semi-cylindrical pivot rods coaxially aligned along a single longitudinal axis. Although this system provides a greater degree of flexibility in the visor design which can utilize relatively flat panels, there remains a need for a system in which pivot mounting of multiple visors for selected use can be achieved with a mounting system which minimizes the cost of the overall installation and allows the flexibility of visor panels which can either be flat planer panels, concave nested panels, or visors which include features such as vanity mirrors or illuminated vanity mirrors, and yet provide a multiple visor installation which has become popular in commercially available vehicles.

SUMMARY OF THE PRESENT INVENTION

The visor system of the present invention provides an improved mounting system for multiple visors in which a first visor is mounted to the vehicle by mounting means for movement of the first visor between a raised stored position and a lowered use position. The mounting means also mounts a second visor to the vehicle for pivoting the second visor between a raised stored position and lowered use positions including a position generally orthogonal to the first visor for providing front and side window protection. The visor mounting means include relatively short pivot rods which allow the nested mounting of the visors with the pivot rods aligned in end-to-end relationship when the visors are in a stored position adjacent each other. In a preferred embodiment of the invention the mounting means includes a base which supports both pivot rods in relationship to one another. In one embodiment of the invention, the second visor includes a vanity mirror which is exposed to the interior of the vehicle when the second visor is in a lowered windshield position. In yet another embodiment of the invention, illumination means are mounted to the base or the vehicle roof to direct light downwardly for use of the vanity mirror under low ambient light conditions.

These and other features, objects and advantages of the present invention will become apparent upon reading of the following description thereof, together with reference to the accompanying drawings in which:

BRIEF DESCRIPTION OF THE DRAWINGS

FIG. 2 is an enlarged left end elevational view of the visor system shown in FIG. 1, shown with the visors raised to a stored position adjacent the vehicle roof;

FIG. 3 is a perspective view of the visor system shown in FIGS. 1 and 2, shown with the visors in a second use position;

DETAILED DESCRIPTION OF THE PREFERRED EMBODIMENT

Figure 1:
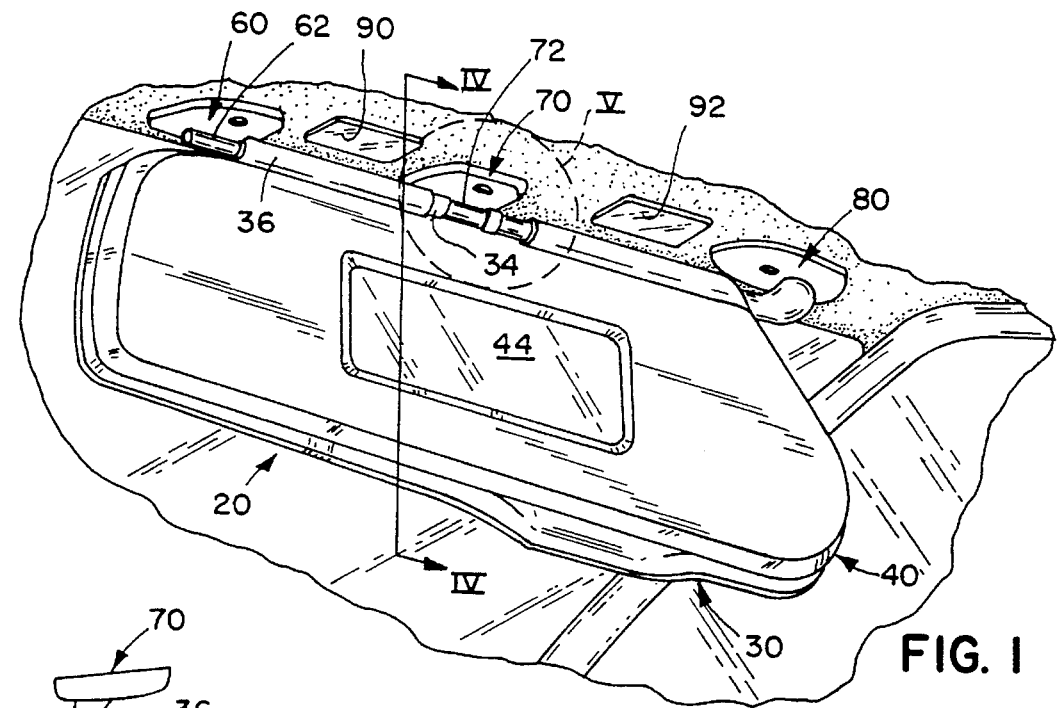
FIG. 1 is a fragmentary perspective view of a vehicle including a multiple visor system constructed according to the present invention and shown in a first use position.
Figure 4:
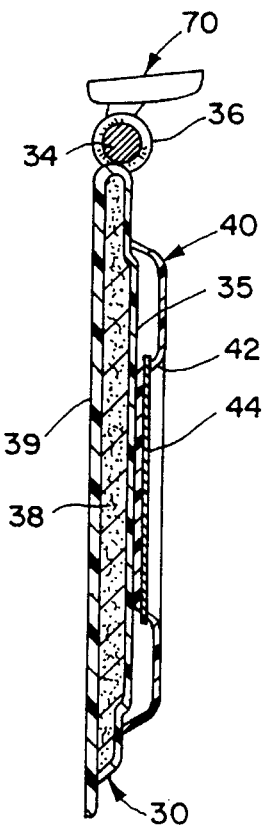
FIG. 4 is a vertical cross-sectional view of the visor system taken along section lines IV—IV of FIG. 1.

Referring initially to FIGS. 1–3, there is shown a vehicle 10 such as an automobile having a windshield 12 and a side window 14 separated by an A-pillar 15. The vehicle includes a visor system 20 embodying the present invention which is mounted to the roof 16 of the vehicle for movement between a raised stored position as shown in FIG. 2 adjacent the front windshield to various use positions, including a first lowered use position as shown in FIG. 1 and a second use position as shown in FIG. 3. The visor system 20 is shown mounted to the passenger side of the vehicle and includes mounting means for a pair of visors 30 and 40. In this embodiment, the mounting means includes first, second and third mounting brackets 60, 70 and 80, respectively, which secure the visors of the system to either the vehicle headliner or directly to the sheet metal roof of the vehicle, utilizing conventional fasteners. Alternatively, snap-in fasteners of the type illustrated in U.S. Pat. No. 4,989,911 can be employed. The visor system 20 comprises a first or main visor 30 and a second or auxiliary visor 40 which can be moved to nest adjacent or proximate the first visor 30 as seen in FIGS. 1, 2 and 4 to operate as a single unit in the forward position of visor 40.

The first visor 30 comprises a generally planar core 38 made of a suitable molded polymeric material although it can also be made of a suitable fiberboard material. Core 38 is covered by an upholstery material such as cloth or vinyl 39 to conform the visor appearance to the interior decor of the vehicle. Visor 30 includes a handle 32 at its lower corner for raising and lowering the visor independently of the second visor 40. Visor 30 is attached to the roof 16 of the vehicle by brackets 60 and 70 which include fasteners such as screws 62' or snap-in fasteners for mounting the spaced-apart mounting brackets 60 and 70 to one or more apertures in the underlying sheet metal roof of the vehicle. Each of the mounting brackets 60 and 70 includes a cylindrical socket 62 and 72 respectively for receiving the ends of a relatively short pivot rod 34 extending along the upper edge 35 of the visor 30 and mounted within a cylindrical housing 36 of the visor 30 as best seen in FIG. 4. Pivot rod 34 can either be fixedly anchored between sockets 62 and 72 with the torque interface being between the pivot rod 34 and the inner-cylindrical diameter of housing 36, or alternatively anchored within housing 36 and movable within sockets 62 and 72. Both mounting arrangements allow holding the visor 30 in a stored position or in selected lowered use positions as illustrated for example in FIGS. 2 and 3. The end of cylindrical socket 72 of mounting bracket 70 remote from pivot rod 34 also includes a hemispherical socket 74 (FIG. 5) for receiving an end 58 of the pivot rod 52 associated with visor 40 as described in greater detail below.

Visor 30 is installed by attaching the mounting brackets 60 and 70 to the pivot rod 34 prior to installation in the vehicle. Visor 30 includes a raised plateau central area 37 (FIGS. 3 & 4) which is generally convex and which extends within a concave mating area 45 (FIG. 3) of visor 40 which is a molded polymeric generally planar member having a recess 42 on a side opposite the concave recess 45 into which a vanity mirror 44 is mounted. Visor 40 also includes a generally cylindrical housing 46 for receiving a visor pivot rod assembly 50. Assembly 50 includes a pivot rod 52 extending within the cylindrical housing 46 to allow the visor 40 to pivot between a raised stored position as illustrated in FIG. 2 to a lowered use position as shown in FIGS. 1 and 3. The end of rod 52 remote from mounting bracket 80 includes a stop 54 for holding the visor onto the pivot rod 52. The end remote from stop 54 includes an elbow bracket 56 which extends within mounting bracket 80 to allow the visor to rotate from the front window position as illustrated in FIG. 1 to the side window position as indicated by arrow A and illustrated in FIG. 3.

Figure 6:
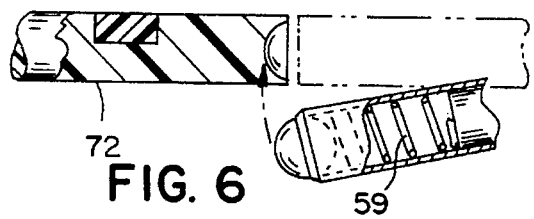
FIG. 6 is a fragmentary top plan view partly in phantom form and partly in cross-section illustrating the operation of the pivot rod end connector shown in FIG. 5.
Figure 5:
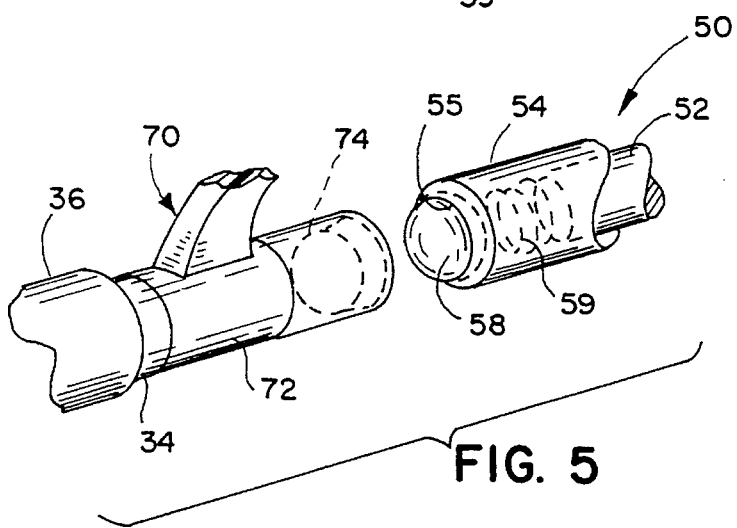
FIG. 5 is a greatly enlarged fragmentary perspective view of a part of the mounting arrangement of the visors shown in the encircled area, identified by arrow V in FIG. 1.

Elbow 56 may provide the torque interconnection of rod 52 to the elbow or the rotation may take place between the interior surface of the cylindrical housing 46 and the outer surface of the cylindrical rod 52 as desired. Elbow 56 is mounted within bracket 80 in any number manners which are well known and can, for example, be attached as illustrated in U.S. Pat. No. 5,242,204 which provides a twist-in visor mount. Any conventional mounting structure which allows the visor rod 52 to pivot from the forward windshield position to the side window position as illustrated can be used. Stop 54 on the end of visor rod 52 includes a spring loaded ball 58 mounted within the cylindrical stop 54 and urged outwardly from a narrowed opening 55 in the end by a compression spring 59 as seen in FIGS. 5 and 6 such that the end of the pivot rod assembly 50 can releasably snap-fit within the hemispherical socket 74 of mounting bracket 70 as seen in FIG. 1 when visors 30 and 40 are mounted together.

Pivot rods 34 and 52 are both relatively short and each extend only partially along lengths of the upper edge of the respective visors 30 and 40. When the visors are in a nested position as shown in FIG. 1, the visor rods align in an end-to-end axially aligned relationship to allow the compact storage of the relatively thin visor system so defined. Thus, by providing shortened, spaced, and axially aligned pivot rods for each of the visors, a compact nestable visor assembly is achieved.

Illumination for the vanity mirror 44 of visor 40 is provided in the preferred embodiment by illumination means mounted within the roof or headliner 16 of the vehicle 10. Each of the illumination means comprises an outer lens 90 and 92 as seen in FIGS. 1 and 3 behind which there is conventionally mounted a bulb socket and bulb coupled to the vehicles electrical operating system by means of a suitable switch such that light from illumination means 90 and 92 is directed downwardly for use of the mirror 44 under low ambient light conditions. The switch may be the manual courtesy lamp switch of the vehicle or a separate switch conveniently mounted on the roof area near the lamps themselves. In some embodiments it may be desired to include the switch in the lamp housing by pressing on the lens as in conventional vehicle overhead lamp assemblies. Provision, however, of spaced apart vanity mirror illumination means in the vehicle roof provides a more compact illuminated vanity mirror visor installation requiring little space which lends itself to the design criteria for modern vehicles having somewhat reduced headroom.

Figure 7:
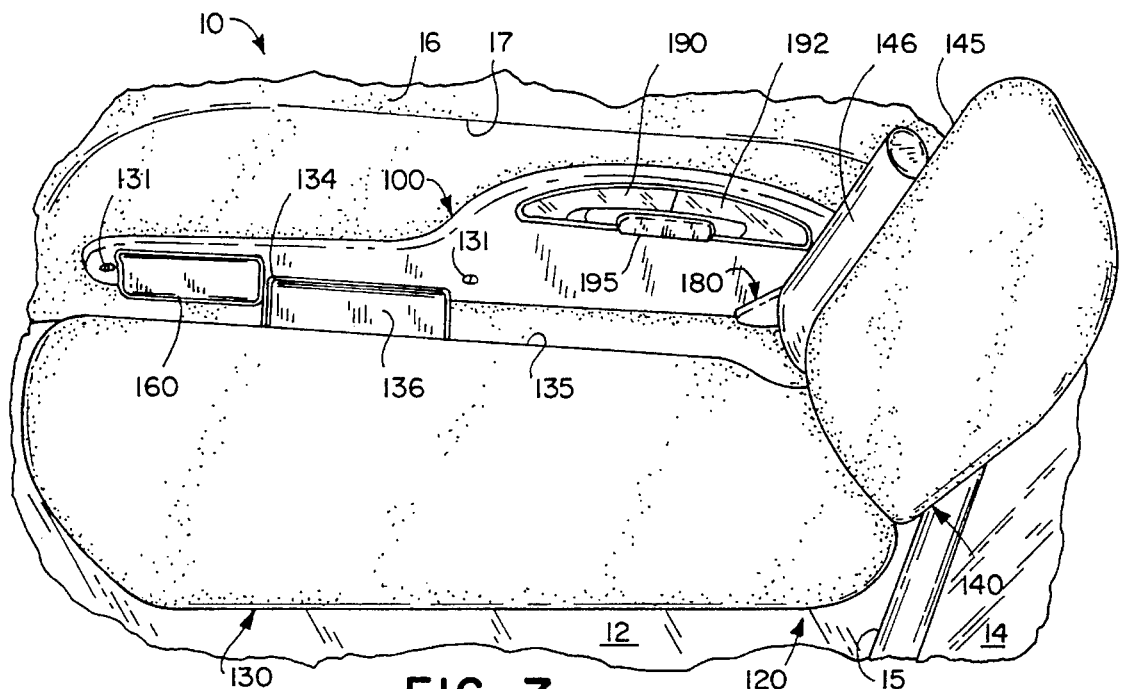
FIG. 7 is a fragmentary perspective view of a vehicle including the preferred embodiment of the visor system of the present invention which is shown in a first use position.
Figure 8:
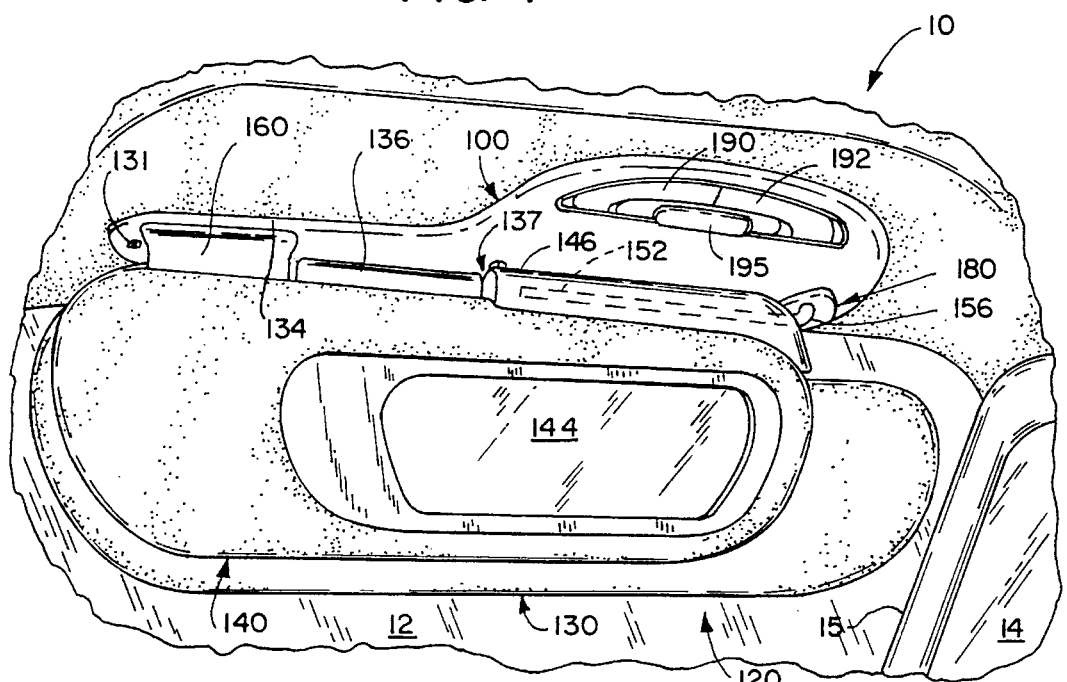
FIG. 8 is a fragmentary perspective view of the visor system shown in FIG. 7 shown in a second use position.

In the preferred embodiment of the invention, a visor system 120 is shown in FIGS. 7 and 8. In this embodiment, the mounting means for a pair of visors 130 and 140 includes a unitary base 100 which supports both of the axially aligned visor pivot rods. In this embodiment, similar parts are identified by the same reference numeral as that used in the first embodiment but preceded by the reference numeral 1. Referring now to FIGS. 7 and 8, the visor system 120 includes visors 130 and 140 which are functionally similar to visors 30 and 40 of the first embodiment. Visor 130 includes a mounting collar 136 along its upper edge 135 which receives a pivot rod 134 which extends outwardly in cantilevered relationship from a mounting bracket 160 which is integral with base 100. Base 100 can be attached to the underlying sheet metal roof of the vehicle by a suitable fastening means such as screw-type fasteners 131 at spaced locations therealong. The base 100 can be integrally molded of suitable polymeric materials such as polycarbonate in which the pivot rod 134 is mounted to extend within the collar 136 of visor 130. The pivot rod provides a torque intercoupling of the visor 130 to the base 100 such that visor 130 can be moved from a raised stored position against the vehicle roof to a lowered use position adjacent the front windshield as desired and as seen in FIG. 7.

Base 100 also receives an elbow pivot rod mounting bracket 180 which receives the elbow assembly 156 in the same manner as in the first embodiment. A pivot rod 152, shown in phantom in FIG. 8, is coupled to elbow assembly 156 and extends within collar 146 extending along the upper edge 145 of visor 140. Collar 146 provides a rotational torque between the visor panel 140 and pivot rod 154 to also allow visor 140 to be raised and lowered between a stored position against the vehicle headliner 16 and held in selected lowered use positions such as shown in FIGS. 7 and 8. As seen in FIG. 8, a clearance gap 137 exists between the right end of collar 136 and the free end of collar 146 to allow the end-to-end axial alignment of pivot rods 134 and 152 and nesting of the visors. The pivot rod mounting bracket 160 and elbow 156 also allows the visor to swing to the side window position as shown in FIG. 7.

Visor 140 also includes a vanity mirror 144 mounted on a side facing the interior of the vehicle when this visor is in a lowered position as seen in FIG. 8. As seen in FIG. 8, the length of visor 140 is substantially shorter than visor 130 and as in the first embodiment, is positioned to nest against the headliner and specifically within a recessed pocket 17 in headliner 16 when the visors are in a raised stored position. Base 100 also includes a lamp assembly for providing illumination from lenses 190 and 192 behind which there are mounted lamps for projecting illumination outwardly from the lenses. An electrical switch 195 selectively couples the vehicle electrical system to the lamps for providing electrical operating power in a conventional manner.

By providing a unitary base 100, the pivot rods 134 and 152 can be accurately aligned with respect to one another for mounting visors 130 and 140 to the base prior to the mounting of the completed sub-assembly to either the headliner 16 or directly to the vehicle roof. This assures that the visors nest properly and move between their proximate and distal respective positions as desired. The relatively light weight construction of visor 130 which can be made possible by using a foam core, a fiberboard core or the like covered by a suitable upholstery fabric allows the utilization of a cantilevered mounting-type pivot rod 134 which extends from bracket 160. Elbow mounting bracket 180 can be of the same type as bracket 80 of FIG. 3 except that it is mounted into the base 100.

A visor system of the present invention, therefore, provides compact multiple visors in which both front and side window protection can be selectively used by the vehicle operator or passenger and one which minimizes the mounting area required for such an installation. Further, it provides a unique pivot mounting for the visors as well as effective lighting for vanity mirrors which may be carried on one or more of the visors provided. It will become apparent to those skilled in the art that various modifications to the preferred embodiment of the invention can be made without departing from the spirit or scope of the invention as defined by the appended claims.

The embodiments of the invention in which an exclusive property or privilege is claimed are defined as follows:

1. A visor system for a vehicle comprising:

first and second visors for mounting to one of the driver's and passenger's side of a vehicle, each of said visors including a pivot rod for allowing movement of said visors between a position in which said first and second visors are proximate one another with their planes generally parallel and extending on only one side of the vehicle to selected spaced-apart use positions, wherein said first visor includes a first pivot rod which extends only partially along one edge of said first visor, and said second visor includes a second pivot rod which extends only partially along one edge of said second visor; and a plurality of spaced mounting brackets for mounting said pivot rods to a vehicle such that said pivot rods are coaxially aligned in end-to-end relationship when said first and second visors are proximate one another, wherein said mounting brackets include a base for securing said first and second pivot rods thereon and wherein said base includes a second bracket which receives a second end of said first pivot rod.

2. The visor system as defined in claim 1 wherein one of said first and second visors includes a vanity mirror.

3. The visor system as defined in claim 2 wherein said base includes a light source for directing illumination for use of said vanity mirror.

4. A visor system for a vehicle comprising:

first and second visors for mounting to one of the driver's and passenger's side of a vehicle for movement between a position in which said first and second visor panels overlap with their planes generally parallel and extending on only one side of the vehicle to selected spaced-apart use positions; and a plurality of spaced-apart pivot rods for movably mounting said first and second visors to the vehicle for pivoting movement along a common pivot axis, wherein said visors each include a pivot rod which extends only along a part of the length of said visor and bracket means for mounting said pivot rods to be coaxially aligned in end-to-end relationship when said first and second visors are proximate one another, said bracket means releasably engaging an end of one of said pivot rods to allow at least one of said visors to be moved to a position generally orthogonal to the axis of said pivot rod of the other of said visors.

5. The visor system as defined in claim 4 wherein said first visor includes a first pivot rod which extends only partially along one edge of said first visor.

6. The visor system as defined in claim 5 wherein said second visor includes a second pivot rod which extends only partially one edge of said second visor.

7. The visor system as defined in claim 6 wherein said bracket means includes a first bracket for receiving a first end of said first pivot rod.

8. The visor system as defined in claim 7 wherein said bracket means includes a second bracket for receiving a first end of said second pivot rod.

9. The visor system as defined in claim 8 wherein said bracket means includes a third bracket which receives a second end of said second pivot rod.

10. A visor system for a vehicle comprising:

first and second visors for mounting to one of the driver's and passenger's side of a vehicle for movement between a position in which said first and second visor panels are proximate one another with their planes generally parallel and extending on only one side of the vehicle to selected spaced-apart use positions, wherein said first visor includes a first pivot rod which extends only partially along one edge of said first visor, and said second visor includes a second pivot rod which extends only partially along one edge of said second visor; and a plurality of spaced-apart pivot rods for movably mounting said first and second visors to the vehicle for pivoting movement along a common pivot axis, wherein said visors each include a pivot rod and bracket means for mounting said pivot rods to be coaxially aligned in end-to-end relationship when said first and second visors are proximate one another, wherein said bracket means includes a first bracket for receiving a first end of said first pivot rod, a second bracket for receiving a first end of said second pivot rod, and a third bracket which receives a second end of said second pivot rod, and wherein said first, second and third brackets are generally linearly spaced when mounted to a vehicle.

11. The visor system as defined in claim 10 wherein one of said first and second visors includes a vanity mirror.

12. The visor system as defined in claim 11 and further including a light source adapted to be mounted to the roof of a vehicle above said first and second visors for directing illumination for use of said vanity mirror.

13. The visor system as defined in claim 12 wherein said light source includes a pair of spaced lenses.

14. A multiple visor system comprising:

first, second and third spaced apart mounting brackets;

a first visor having a first pivot rod extending along only a segment of one edge of said first visor, said first pivot rod mounted between said first and second mounting brackets and to said first visor to allow said first visor to be raised and lowered; and a second visor having a second pivot rod extending along only a segment of one edge of said second visor, said second pivot rod having one end releasably coupled to said second mounting bracket and an opposite end pivotally mounted to said third mounting bracket to allow said second visor to overlay said first visor when both visors are in a raised stored position with said pivot rods aligned in end-to-end relationship and pivot to a position remote from said first visor when in selected use positions.

15. The multiple visor system as defined in claim 14 wherein said first and second visors have bodies which nest to define a single combined visor when said pivot rods are axially aligned and said visors are proximate one another.

16. The multiple visor system as defined in claim 15 wherein at least one of said visors includes a vanity mirror.

17. The multiple visor system as defined in claim 16 wherein said second visor has a vanity mirror.

18. The multiple visor system as defined in claim 17 and further including means for illuminating said vanity mirror.

19. The multiple visor system as defined in claim 18 wherein said illumination means includes a pair of lenses adapted to be mounted between said first, second and third mounting brackets.

20. A visor system for a vehicle comprising:

first and second visors for mounting to one of the driver's and passenger's side of a vehicle for movement between a position in which said first and second visors are proximate one another with their planes generally parallel and extending on only one side of the vehicle to selected spaced-apart use positions, wherein said first visor includes a first pivot rod which extends only partially along one edge of said first visor, and said second visor includes a second pivot rod which extends only partially along one edge of said second visor; and a plurality of spaced-apart brackets for movably mounting said first and second visors to the vehicle for pivoting movement along a common pivot axis, wherein one of said brackets receives a first end of said first pivot rod and removably receives a first end of said second pivot rod such that said pivot rods are coaxially aligned in end-to-end relationship when said first and second visors are proximate one another.

21. The visor system as defined in claim 20 wherein a second one of said brackets receives a second end of said first pivot rod.

22. The visor system as defined in claim 21 and further including a third bracket which pivotally receives a second end of said second pivot rod.

23. The visor system as defined in claim 22 wherein said first, second and third brackets are generally linearly spaced when mounted to a vehicle.

24. The visor system as defined in claim 23 wherein one of said first and second visors includes a vanity mirror.

25. The visor system as defined in claim 24 and further including a light source adapted to be mounted to the roof of a vehicle above said first and second visors for directing illumination for use of said vanity mirror.

26. The visor system as defined in claim 25 wherein said light source includes a pair of spaced lenses aligned between said brackets.

* * * * *

UNITED STATES PATENT AND TRADEMARK OFFICE
CERTIFICATE OF CORRECTION

PATENT NO.  : 5,577,792
DATED       : November 26, 1996
INVENTOR(S) : Muyres et al.

It is certified that error appears in the above-identified patent and that said Letters Patent is hereby corrected as shown below:

Column 2, line 18;
    "1." should be --1;--.

Column 2, line 24;
    "cross-section" should be --cross section--.

Column 3, line 42;
    After "number" insert --of--.

Column 4, line 16;
    "modem" should be --modern--.

Column 6, line 15;
    After "partially" insert --along--.

Column 6, line 59;
    "spaced apart" should be --spaced-apart--.

Signed and Sealed this

First Day of April, 1997

Attest:

BRUCE LEHMAN

*Attesting Officer*     *Commissioner of Patents and Trademarks*